(12) United States Patent
Osada et al.

(10) Patent No.: US 11,047,453 B2
(45) Date of Patent: Jun. 29, 2021

(54) POWER DISTRIBUTION DEVICE

(71) Applicant: KABUSHIKI KAISHA TOYOTA CHUO KENKYUSHO, Nagakute (JP)

(72) Inventors: Yasumitsu Osada, Nagakute (JP); Teruhiko Nakazawa, Nagakute (JP); Atsushi Suzuki, Nagakute (JP); Hiroyuki Nishizawa, Nagakute (JP); Yasuhiro Torii, Okazaki (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 140 days.

(21) Appl. No.: 16/358,291

(22) Filed: Mar. 19, 2019

(65) Prior Publication Data

US 2019/0316655 A1  Oct. 17, 2019

(30) Foreign Application Priority Data

Apr. 12, 2018  (JP) .............................. JP2018-076741

(51) Int. Cl.
| | |
|---|---|
| *F16H 3/66* | (2006.01) |
| *B60K 17/346* | (2006.01) |
| *F16H 3/72* | (2006.01) |
| *F16H 37/08* | (2006.01) |
| *B60L 15/20* | (2006.01) |

(52) U.S. Cl.
CPC .......... *F16H 3/666* (2013.01); *B60K 17/346* (2013.01); *B60L 15/20* (2013.01); *F16H 3/724* (2013.01); *F16H 37/0826* (2013.01)

(58) Field of Classification Search
CPC .......... F16H 48/36; F16H 3/666; F16H 3/724
See application file for complete search history.

(56) References Cited

U.S. PATENT DOCUMENTS

| 5,387,161 A | 2/1995 | Shibahata |
| 8,430,779 B2 * | 4/2013 | Hoehn .................... F16H 48/11 475/225 |

FOREIGN PATENT DOCUMENTS

JP  H04-321435 A  11/1992

* cited by examiner

*Primary Examiner* — Derek D Knight
(74) *Attorney, Agent, or Firm* — Oliff PLC

(57) ABSTRACT

A planetary gear mechanism has a first planetary gear train that includes a ring gear to which power from a main power source is input, a planetary carrier that is connected to a first output shaft, a first planetary pinion that is turnably supported by the planetary carrier, and a first sun gear that is connected to a distribution electric motor. The planetary gear mechanism also has a second planetary gear train that includes the ring gear, the planetary carrier, the first planetary pinion, a second planetary pinion that is turnably supported by the planetary carrier, and a second sun gear that is connected to a second output shaft.

6 Claims, 5 Drawing Sheets

POWER DISTRIBUTION DEVICE

CROSS REFERENCE TO RELATED APPLICATION

This application claims priority to Japanese Patent Application No. 2018-076741 filed on Apr. 12, 2018, which is incorporated herein by reference in its entirety including the specification, claims, drawings, and abstract.

TECHNICAL FIELD

The present disclosure relates to a power distribution device that splits power input from a main power source between two output shafts and, in particular, relates to a power distribution device having a variable torque distribution ratio.

BACKGROUND

There are known power distribution devices having the function of a differential that split output torque from a prime motor such as an internal combustion engine or an electric motor between right and left drive wheels or between front and rear drive wheels, wherein the distribution ratio is variable.

Patent Document 1 identified below discloses a power distribution device including two planetary gear trains: a planetary gear train that serves as a differential gear (D), and a planetary gear train (planetary gear mechanism P) for changing the distribution ratio of torque. The planetary gear train (D) serving as a differential gear includes a ring gear (4) to which power from an engine (E) is input, and the power is transferred via a planetary carrier (8) to a right shaft (9) and via a sun gear (5) to a left shaft (10). The planetary gear train (P) includes a sun gear (14) to which a motor (20) is connected, a planetary carrier (12) to which the left shaft (10) is connected, and a ring gear (15) to which the planetary carrier (8), one of the two output elements of the differential gear (D), is connected. As the output torque of the motor (20) is changed, the torque distribution ratio of the right and left shafts (9 and 10) is changed.

In this device, each of the two planetary gear trains (P and D) includes three elements: a sun gear, a planetary carrier, and a ring gear. The planetary carrier (12) of one planetary gear train (P) and the sun gear (5) of the other planetary gear train (D) are connected to each other, and, therefore, it is necessary to provide a component for joining together the planetary carrier (12) and the left shaft (10) to which the sun gear (5) is joined. The ring gear (15) of one planetary gear train (P) and the planetary carrier (8) of the other planetary gear train (D) are connected to each other, and, therefore, there is provided a component that includes two pinions (18 and 19) that are disposed on one shaft and respectively mesh with the planetary carrier (8) and the ring gear (15).

It should be noted that component names and reference numerals in parentheses above are those used in Patent Document 1, which is identified below, and are irrelevant to component names and reference numerals used in connection with embodiments of the present disclosure.

CITATION LIST

Patent Literature

Patent Document 1: JP H4-321435 A

SUMMARY

In the art of power distribution devices, there are demands for a simplified and downsized structure. The present disclosure is directed toward providing a power distribution device having a simple structure and being small in size.

According to an aspect of the present disclosure, there is provided a power distribution device for splitting power input from a main power source between a first output shaft and a second output shaft, the power distribution device having a variable torque distribution ratio and including a planetary gear mechanism, and a distribution electric motor for changing the torque distribution ratio. The planetary gear mechanism includes a ring gear to which power from a main power source is input; a planetary carrier that is connected to the first output shaft; a first planetary pinion that is turnably supported by the planetary carrier and meshes with the ring gear; a second planetary pinion that is turnably supported by the planetary carrier and meshes with the first planetary pinion; a first sun gear that is connected to the distribution electric motor and meshes with the first planetary pinion; and a second sun gear that is connected to the second output shaft and meshes with the second planetary pinion. In response to torque input from the distribution electric motor to the planetary gear mechanism, the torque distribution ratio is changed.

According to another aspect, the first sun gear may be attached on a first sun gear shaft that is a hollow shaft having a space through which the second output shaft extends, and a rotor of the distribution electric motor may be joined to the first sun gear shaft.

According to still another aspect, the first sun gear may be attached on a first sun gear shaft that is a hollow shaft having a space through which the second output shaft extends, and the first sun gear shaft may be connected to a rotor of the distribution electric motor via a reduction gear pair that slows down turning of the distribution electric motor and transfers it to the first sun gear shaft.

According to still another aspect, the first output shaft may be connected to the planetary carrier via a first intermediate shaft joined to the planetary carrier and a first reduction gear pair that slows down turning of the first intermediate shaft and transfers it to the first output shaft; the second output shaft may be connected to the second sun gear via a second intermediate shaft joined to the second sun gear and a second reduction gear pair that slows down turning of the second intermediate shaft and transfers it to the second output shaft; and the second intermediate shaft may be a hollow shaft having a space through which a first sun gear shaft extends, the first sun gear shaft joining together the distribution electric motor and the first sun gear.

By employing the aspects disclosed herein, the number of components in a planetary gear mechanism may be reduced, and a simpler structure and a smaller device size may be achieved.

BRIEF DESCRIPTION OF DRAWINGS

Embodiments of the present disclosure will be described by reference to the following figures, wherein.

DESCRIPTION OF EMBODIMENTS

Figure 1:
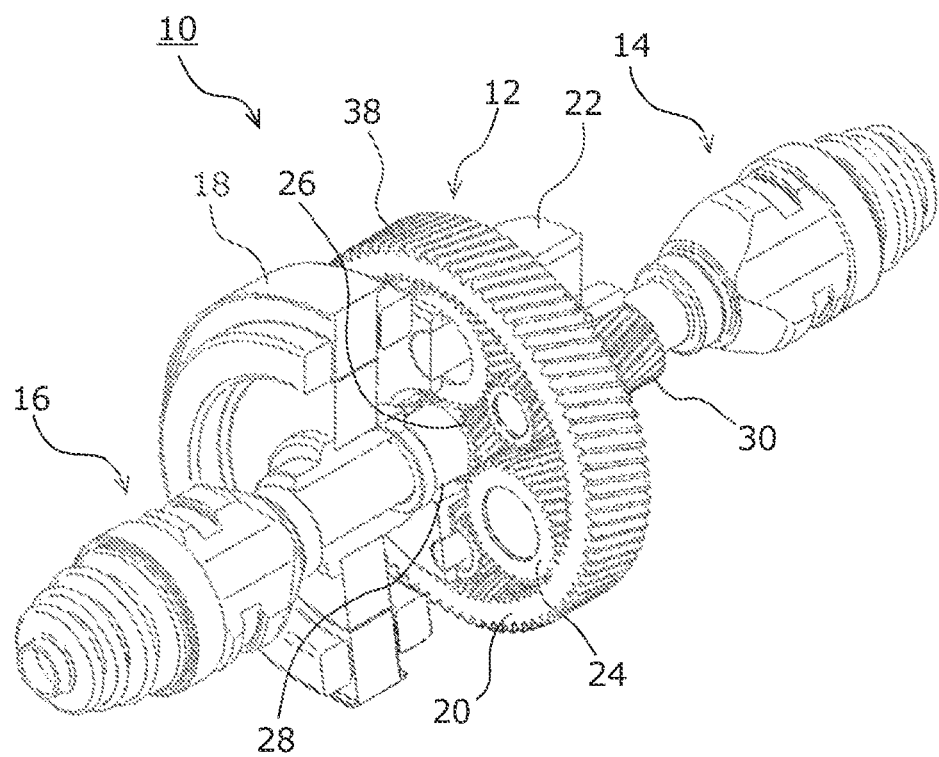
FIG. 1 is a perspective view illustrating a structure of a power distribution device according to an embodiment of the present disclosure, in which a portion is a cutaway view.
Figure 2:
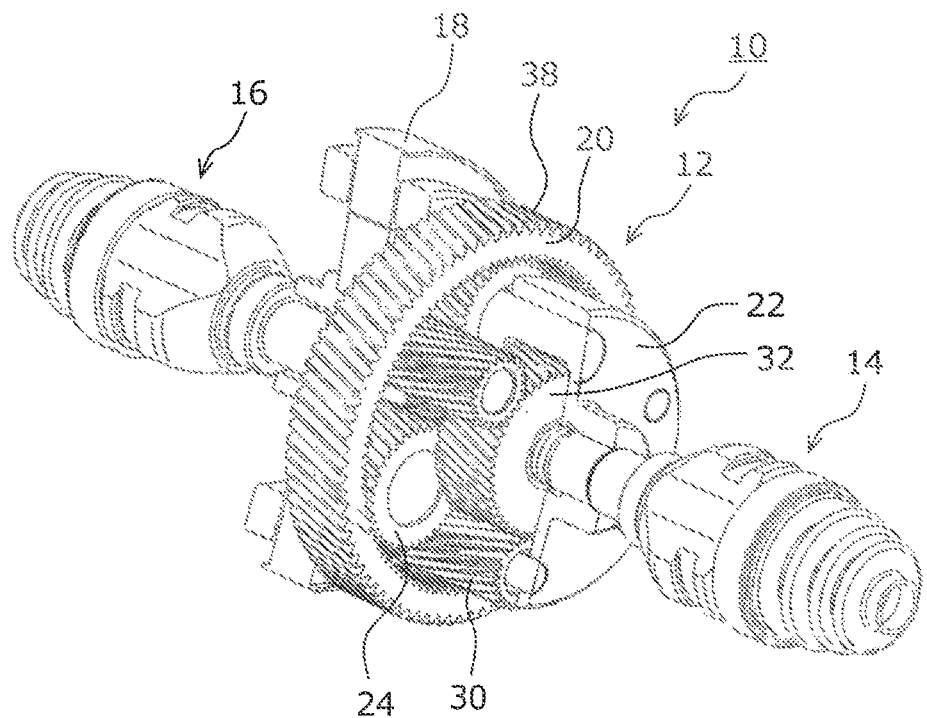
FIG. 2 is a partially cutaway perspective view illustrating the power distribution device of FIG. 1 as viewed from another direction.
Figure 3:
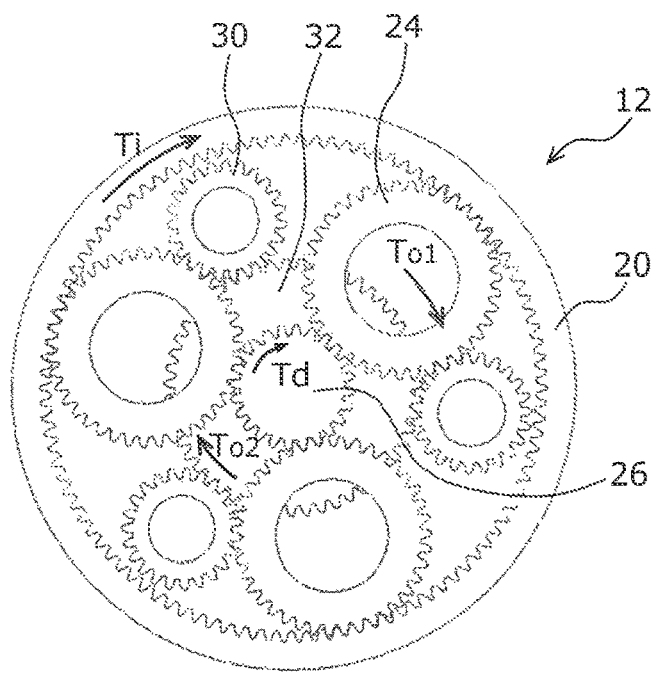
FIG. 3 illustrates a relationship between gears and pinions in a planetary gear mechanism as viewed in the axial direction.
Figure 4:
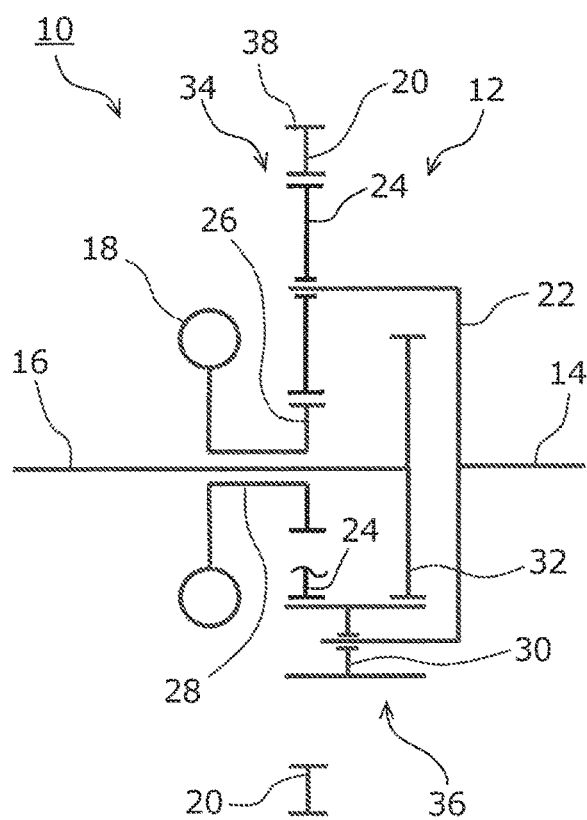
FIG. 4 is a schematic view of the power distribution device illustrated in FIG. 1.

Embodiments of the present disclosure will be described below with reference to the accompanying drawings. FIGS. 1 and 2 are partially cutaway perspective views illustrating a power distribution device 10 according to an embodiment of the present disclosure. FIG. 3 illustrates a relationship between gears in a planetary gear mechanism. FIG. 4 is a schematic view schematically illustrating a structure of gear trains in the power distribution device 10.

The power distribution device 10 splits power input to a planetary gear mechanism 12 between two output shafts 14 and 16. Torque from a distribution electric motor 18 is input to the planetary gear mechanism 12, and the distribution ratio of torque split between the two output shafts 14 and 16 can be changed. The illustrated power distribution device 10 splits power from a prime motor such as an internal combustion engine or an electric motor between right and left drive wheels of a vehicle, and also serves as a differential gear.

The planetary gear mechanism 12 includes a ring gear 20 that is an internal gear to which power from a main power source is input; a planetary carrier 22 that is connected to the output shaft 14; a first planetary pinion 24 that is turnably supported by the planetary carrier 22 and meshes with the ring gear 20; and a first sun gear 26 that meshes with the first planetary pinion 24. The distribution electric motor 18 is connected to the first sun gear 26 via a first sun gear shaft 28. The first sun gear shaft 28 is joined to a rotor of the distribution electric motor 18. The planetary carrier 22 further turnably supports a second planetary pinion 30 that meshes with the first planetary pinion 24, and the second planetary pinion 30 meshes with a second sun gear 32. Another output shaft 16 is connected to the second sun gear 32. In the following description, the output shaft 14 connected to the planetary carrier 22 is referred to as a first output shaft 14, and the output shaft 16 connected to the second sun gear 32 is referred to as a second output shaft 16. In this power distribution device 10, the planetary carrier 22 is joined to and turns together with the first output shaft 14, and the second sun gear 32 is joined to and turns together with the second output shaft 16. The ring gear 20, the planetary carrier 22, the first sun gear 26, and the second sun gear 32 are turnably supported about the axis of the first output shaft 14 and the second output shaft 16. The first sun gear shaft 28 is a hollow shaft having a hollow space through which the second output shaft 16 extends. Therefore, the second output shaft 16 and the distribution electric motor 18 are disposed in a coaxial manner.

As well illustrated in FIG. 3, the first planetary pinion 24 meshes with the ring gear 20 and the first sun gear 26, and together with these gears 20 and 26, constitutes a first planetary gear train 34 having a single-pinion configuration (see FIG. 4). The first planetary pinion 24 is also connected via the second planetary pinion 30 to the second sun gear 32, and together with the second planetary pinion 30, the second sun gear 32, and the ring gear 20, constitutes a second planetary gear train 36 having a double-pinion configuration (see FIG. 4). The first planetary gear train 34 and the second planetary gear train 36 constitute what is known as a Ravigneaux planetary gear mechanism, in which the ring gear 20, the planetary carrier 22, and the first planetary pinion 24 are shared between the first planetary gear train 34 and the second planetary gear train 36.

The ring gear 20 has an input gear 38 on its outer surface. An output pinion (not illustrated) joined to a rotor shaft of a main power source such as an electric motor meshes with the input gear 38. As power from the main power source is input to the ring gear 20, the ring gear 20 turns, and the first planetary pinion 24 correspondingly turns together with the planetary carrier 22. The first planetary pinion 24, which is turnably supported by the planetary carrier 22, turns with respect to the planetary carrier 22 when there is a difference between the turning speeds of the ring gear 20 and the planetary carrier 22. The motion of the first planetary pinion 24 that turns together with the planetary carrier 22 (integral turning) is referred to as revolution, and the motion of the first planetary pinion 24 that turns with respect to the planetary carrier 22 is referred to as rotation. As the first planetary pinion 24 revolves, the planetary 22 turns, and the first output shaft 14 turns. The second planetary pinion 30 meshes with the first planetary pinion 24, and the second planetary pinion 30 is turnably supported by the planetary carrier 22; therefore, as the first planetary pinion 24 revolves and rotates, the second planetary pinion 30 also revolves and rotates. Similarly as for the first planetary pinion 24, the motion of the second planetary pinion 30 that turns together with the planetary carrier 22 (integral turning) is referred to as revolution, and the motion of the second planetary pinion 30 that turns with respect to the planetary carrier 22 is referred to as rotation. As the second planetary pinion 30 rotates and revolves, the second sun gear 32 turns, and the second output shaft 16 turns.

The planetary gear mechanism 12 serves as a differential gear that has no differential limit. When the first output shaft 14 and the second output shaft 16 turn at the same speed, as the ring gear 20 turns, the first and second planetary pinions 24 and 30 do not rotate but revolve, and the planetary carrier 22 and the second sun gear 32 also turn at the same speed as that of the ring gear 20. When there is a difference between the turning speeds of the first output shaft 14 and the second output shaft 16, the first and second planetary pinions 24 and 30 rotate while revolving, and absorb the difference between the turning speeds of the two output shafts. Torque is equally split between the first output shaft 14 and the second output shaft 16 even when there is a difference between the turning speeds of these output shafts.

Torque is input to the first sun gear 26 by means of the distribution electric motor 18, and the distribution ratio of torque split between the two output shafts 14 and 16 can be changed. As torque Td is input to the first sun gear 26 by means of the distribution electric motor 18, torque is input via the first planetary pinion 24 to the planetary carrier 22. If the torque Td is in the same direction as that of torque Ti that is input from the ring gear 20 to the first planetary pinion 24, torque To1 of the planetary carrier 22 and the first output shaft 14 increases. The second planetary pinion 30 also meshes with the first planetary pinion 24, and the torque Td of the distribution electric motor 18 input to the first planetary pinion 24 is input via the second planetary pinion 30 to the second sun gear 32 and the second output shaft 16. Torque To2 input to the second output shaft 16 is transferred via one gear (the second planetary pinion 30) and therefore, is in the opposite direction to that of the torque To1 input to the first output shaft 14. Therefore, as the torque To1 of the first output shaft 14 increases, the torque To2 of the second output shaft 16 decreases. By this action, the distribution ratio of torque split between the first output shaft 14 and the second output shaft 16 is changed.

Figure 5:
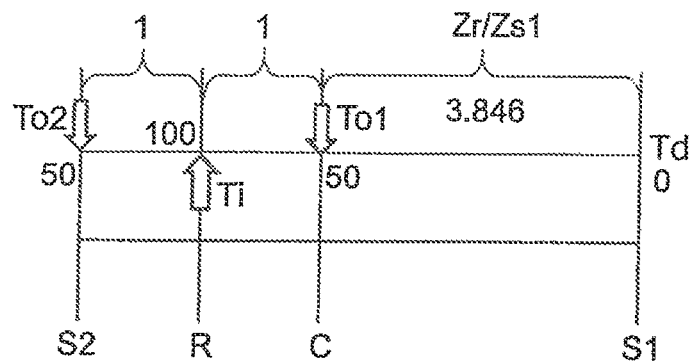
FIG. 5 is an illustration concerning change in torque distribution ratio and illustrates a state as observed when torque is equally split between two output shafts.
Figure 6:
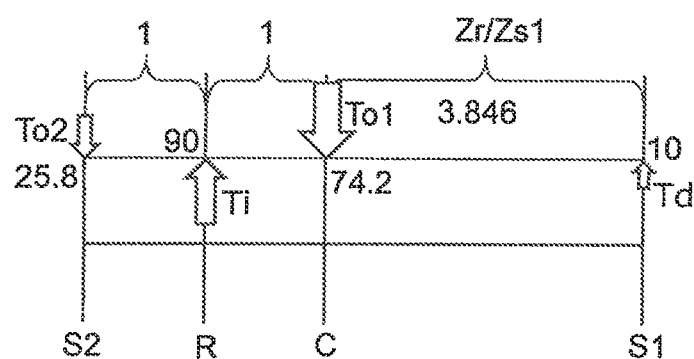
FIG. 6 is an illustration concerning change in torque distribution ratio and illustrates a state as observed when greater torque is transferred to one output shaft.
Figure 7:
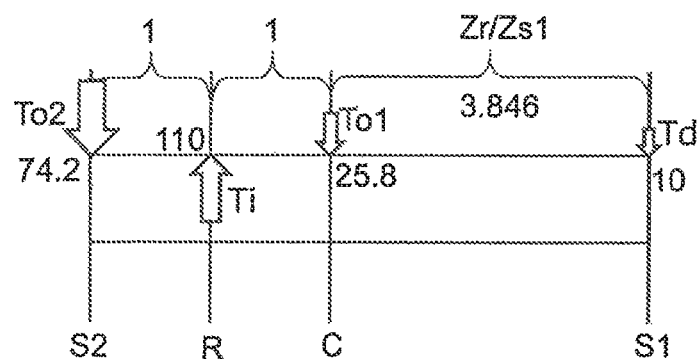
FIG. 7 is an illustration concerning change in torque distribution ratio and illustrates a state as observed when greater torque is transferred to the other output shaft.

FIGS. 5 to 7 are what we call alignment charts, which provide speeds and torque ratios of elements (the ring gear 20, the planetary carrier 22, and the first and second sun gears 26 and 32) of the planetary gear mechanism 12 in the power distribution device 10. In a specific example, the number of teeth, Zr, of the ring gear 20 is 100, the number of teeth, Zs1, of the first sun gear 26 is 26, the number of teeth, Zs2, of the second sun gear 32 is 50, and the number of teeth, Zp1, of the first planetary pinion 24 is 37. A vertical line R represents the speed of the ring gear 20, and similarly, a vertical line C represents the speed of the planetary carrier 22 and vertical lines S1 and S2 respectively represent the speeds of the first sun gear 26 and the second sun gear 32. The speeds of these elements are in a relationship such that, when the speeds of two elements are determined, the speeds of the remaining elements are uniquely determined. The speeds of the elements are represented by points of intersection of vertical lines and straight lines intersecting the vertical lines. FIGS. 5 to 7 illustrate an example where the speeds of the elements are equal to each other, in which the straight lines intersecting the vertical lines are perpendicular to the vertical lines. When a difference occurs between the speed of the first output shaft 14 and the speed of the second output shaft 16, the straight lines intersecting the vertical lines will be inclined.

Torque acting on each element is indicated on a vertical line corresponding to that element. Torque acting on the ring gear 20; that is, torque Ti input to the ring gear 20, is indicated on the vertical line R, and similarly, the torque To1 acting on the first output shaft 14 is indicated on the vertical line C, the torque To2 acting on the second output shaft 16 is indicated on the vertical line S2, and the torque Td input from the distribution electric motor is indicated on the vertical line S1. In the following description, the torque Ti is referred to as input torque, the torque To1 is referred to as first output shaft torque To1, the torque To2 is referred to as second output shaft torque To2, and the torque Td is referred to as distribution torque Td. The sum of the torque is zero, and the sum of the moment generated by the torque illustrated in the figures is also zero.

FIG. 5 illustrates a state in which the input torque Ti is equally split between the first output shaft 14 and the second output shaft 16. When it is assumed that the input torque Ti is 100, the first output shaft torque To1 and the second output shaft torque To2 are each 50.

FIG. 6 illustrates a state as observed when the distribution torque Td acts in the same direction as that of the input torque Ti. The input torque Ti is decreased so that the total torque input to the planetary gear mechanism 12 is the same as that in FIG. 5. In the illustrated example, the distribution torque Td is set to 10 and the input torque Ti is set to 90 so that the total is 100. At this time, the first output shaft torque To1 is 74.2 and the second output shaft torque To2 is 25.8; that is, the distribution ratio is changed.

FIG. 7 illustrates a state as observed when the distribution torque Td acts in the opposite direction to that of the input torque Ti. The input torque Ti is increased so that the total torque input to the planetary gear mechanism 12 is the same as that in FIG. 5. In the illustrated example, the distribution torque Td is set to −10 and the input torque Ti is set to 110 so that the total is 100. At this time, the first output shaft torque To1 is 25.8 and the second output shaft torque To2 is 74.2; that is, the distribution ratio is changed.

The farther the vertical line S1 is spaced apart from the remaining vertical lines, the greater the distribution ratio that can be obtained by a small distribution torque Td. Therefore, the gear ratio of the ring gear 20 and the first sun gear 26 (Zr/Zs1) is set to be large, and, in other words, the number of teeth of the first planetary pinion 24 is set to be large. However, the number of teeth; that is, the size, of the first planetary pinion 24 is limited. Specifically, the first planetary pinion 24 meshes with one of the two second planetary pinions 30 that are located near the first planetary pinion 24 but does not mesh with the other second planetary pinion 30; the size of the first planetary pinion 24 can be increased up to the extent that the first planetary pinion 24 does not interfere with the latter second planetary pinion 30.

Because the two planetary gear trains 34 and 36 in the planetary gear mechanism 12 of the power distribution device 10 share the same ring gear 20 and the same planetary carrier 22, the number of components can be reduced as compared to a planetary gear mechanism that includes two planetary gear trains each having three elements. Because the two planetary gear trains 34 and 36 are connected by the second planetary pinion 30 which is one element of a planetary gear train, the number of components can be reduced as compared to a structure that includes a separate connecting component.

Figure 8:
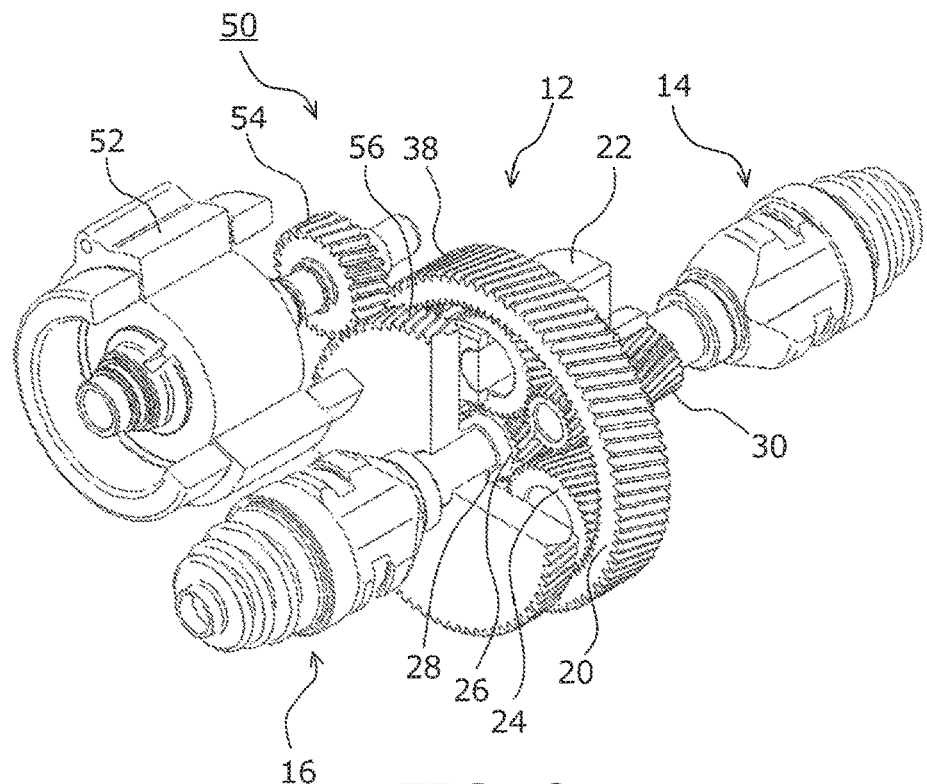
FIG. 8 is a perspective view illustrating a structure of a power distribution device according to another embodiment of the present disclosure, in which a portion is a cutaway view.
Figure 9:
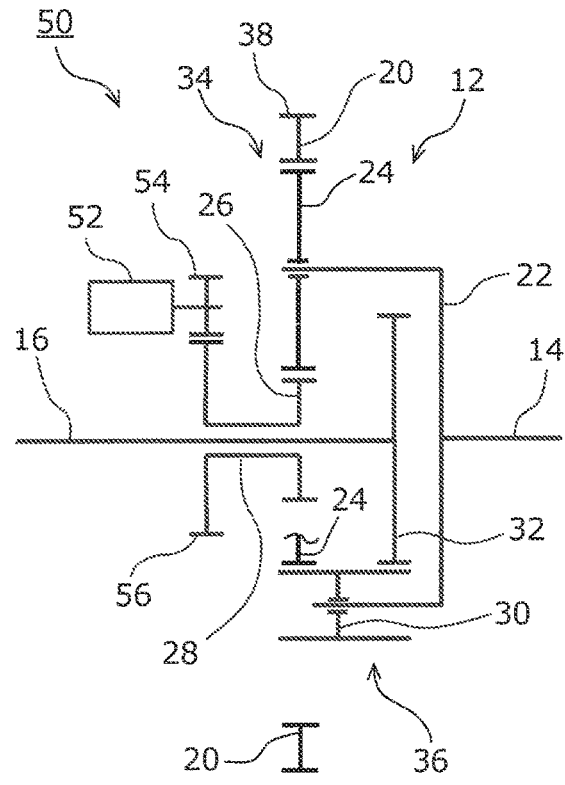
FIG. 9 is a schematic view of the power distribution device illustrated in FIG. 8.

FIGS. 8 and 9 illustrate a power distribution device 50 according to another embodiment of the present disclosure; FIG. 8 is a perspective view in which a portion is a cutaway view, and FIG. 9 is a schematic view. Components similar to those of the power distribution device 10 described above are denoted by the same reference numerals and their description is not repeated here. In the power distribution device 50, the first sun gear 26 and a distribution electric motor 52 are connected in a manner different from the manner in which the first sun gear 26 and the distribution electric motor 18 are connected in the power distribution device 10. The distribution electric motor 52 of the power distribution device 50 is connected to the first sun gear 26 via a reduction gear pair that is composed of a gear 54 joined to a rotor shaft of the electric motor 52 and a gear 56 joined to the first sun gear shaft 28.

In the power distribution device 50, the distribution electric motor 52 has high configuration flexibility; external measurements (diameter and axial length) of the distribution electric motor 52 or other constraints are relaxed as compared to a structure in which a distribution electric motor is disposed coaxially with the second output shaft 16. Because the distribution electric motor 52 is connected to the first sun gear 26 via a reduction gear train, amplified torque can be input to the planetary gear mechanism 12. Therefore, a greater torque distribution ratio can be obtained. As the structure of the planetary gear mechanism 12 is similar to that of the power distribution device 10, as described above, the number of components of the planetary gear mechanism can be reduced.

Figure 10:
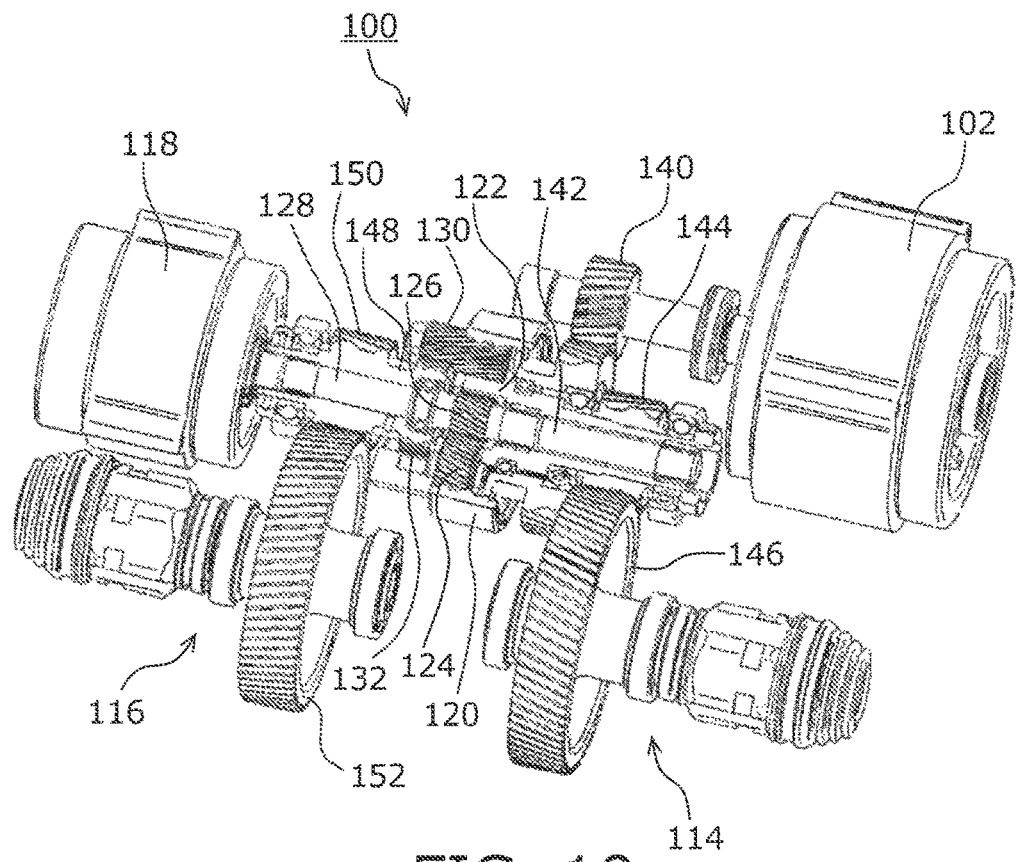
FIG. 10 is a perspective view illustrating a structure of a power distribution device according to still another embodiment of the present disclosure, in which a portion is a cutaway view.
Figure 11:
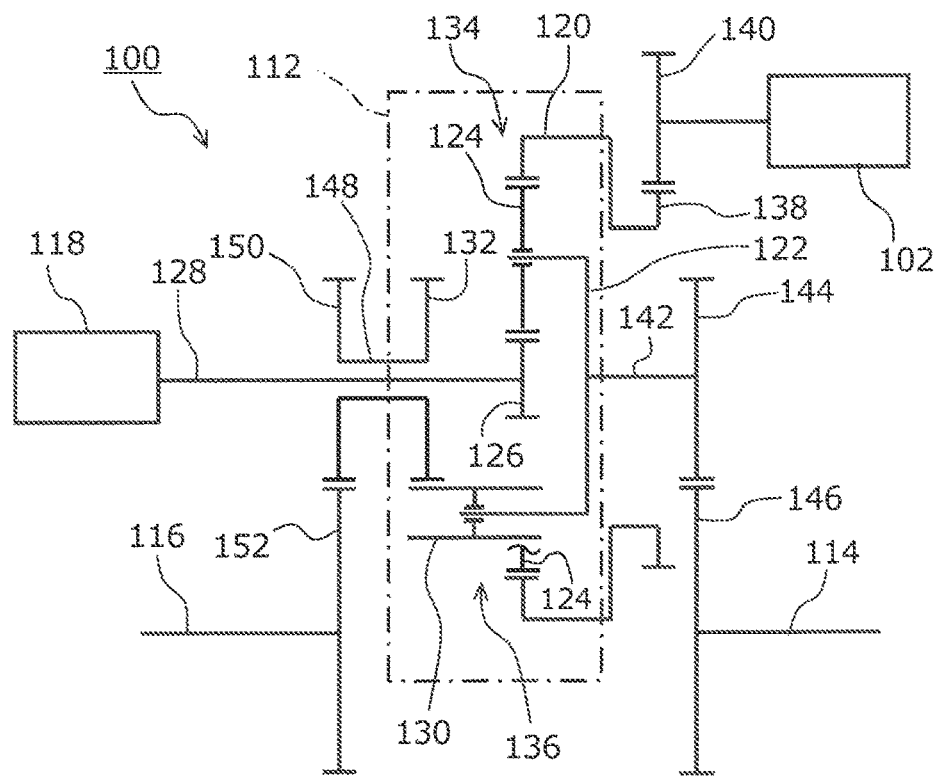
FIG. 11 is a schematic view of the power distribution device illustrated in FIG. 10.

FIGS. 10 and 11 illustrate a power distribution device 100 according to still another embodiment of the present disclosure; FIG. 10 is a perspective view in which a portion is a cutaway view, and FIG. 11 is a schematic view.

The power distribution device 100 splits power input from a main electric motor 102 serving as a main power source to a planetary gear mechanism 112 between two output shafts 114 and 116. Torque from a distribution electric motor 118 is input to the planetary gear mechanism 112, and the distribution ratio of torque split between the two output shafts 114 and 116 can be changed. The illustrated power distribution device 100 splits power from a prime motor such as an internal combustion engine between right and left drive wheels of a vehicle, and also serves as a differential gear.

The planetary gear mechanism 112 includes a ring gear 120 that is an internal gear to which power from a main power source is input; a planetary carrier 122 that is connected to the output shaft 114 via a reduction gear pair; a first planetary pinion 124 that is turnably supported by the planetary carrier 122 and meshes with the ring gear 120; and a first sun gear 126 that meshes with the first planetary pinion 124. The distribution electric motor 118 is connected to the first sun gear 126 via a first sun gear shaft 128. The first sun gear shaft 128 is joined to a rotor of the distribution electric motor 118. The planetary carrier 122 further turnably supports a second planetary pinion 130 that meshes with the first planetary pinion 124, and the second planetary pinion 130 meshes with a second sun gear 132. Another output shaft 116 is connected to the second sun gear 132 via a reduction gear pair. In the following description, the output shaft 114 connected to the planetary carrier 122 is referred to as a first output shaft 114, and the output shaft 116 connected to the second sun gear 132 is referred to as a second output shaft 116. The ring gear 120, the planetary carrier 122, the first sign gear 126, and the second sun gear 132 are turnably supported about the same axis.

The structure of the planetary gear mechanism 112 is similar to that of the planetary gear mechanism 12 described above. Specifically, the first planetary pinion 124 meshes with the ring gear 120 and the first sun gear 126, and together with these gears 120 and 126, constitutes a first planetary gear train 134 having a single-pinion configuration. The first planetary pinion 124 is also connected via the second planetary pinion 130 to the second sun gear 132, and together with the second planetary pinion 130, the second sun gear 132, and the ring gear 120, constitutes a second planetary gear train 136 having a double-pinion configuration. The first planetary gear train 134 and the second planetary gear train 136 constitute what is known as a Ravigneaux planetary gear mechanism, in which the ring gear 120, the planetary carrier 122, and the first planetary pinion 124 are shared between the first planetary gear train 134 and the second planetary gear train 136.

The ring gear 120 has an input gear 138 that turns together with the ring gear 120, and the input gear 138 meshes with an output pinion 140 joined to a rotor shaft of the main electric motor 102. A first intermediate shaft 142 is joined to the planetary carrier 122, and the planetary carrier 122 and the first output shaft 114 are connected via a reduction gear pair that is composed of a gear 144 disposed on the first intermediate shaft 142 and a gear 146 disposed on the first output shaft 114. A second intermediate shaft 148 is joined to the second sun gear 132, and the second sun gear 132 and the second output shaft 116 are connected via a reduction gear pair that is composed of a gear 150 disposed on the second intermediate shaft 148 and a gear 152 disposed on the second output shaft 116. The ring gear 120, the planetary carrier 122, the first sun gear 126, and the second sun gear 132 are turnably supported about the turning axis of the first and second intermediate shafts 142 and 148. The second intermediate shaft 148 is a hollow shaft having a hollow space through which the first sun gear shaft 128 extends.

Because the power distribution device 100 transmits an output from the planetary gear mechanism 112 to the first and second output shafts 114 and 116 after slowing it down through a reduction gear pair, as compared to a structure in which the output is transmitted directly to the output shafts, torque applied to the gears and the pinions of the planetary gear mechanism 112 can be reduced, and the planetary gear mechanism 112 can be downsized. Because the second intermediate shaft 148 is a hollow shaft through which the first sun gear shaft 128 extends, as compared to a structure in which the shafts are disposed in an opposite manner; that is, the first sun gear shaft 128 is disposed outside the second intermediate shaft 148, the diameter of the second intermediate shaft 148, to which greater torque is applied, can be increased. As the structure of the planetary gear mechanism 112 is similar to that of the planetary gear mechanism 12 of the power distribution device 10, as described above, the number of components of the planetary gear mechanism can be reduced.

The invention claimed is:

1. A power distribution device for splitting power input from a main power source between a first output shaft and a second output shaft, the power distribution device having a variable torque distribution ratio and comprising:
   a planetary gear mechanism including:
      a ring gear to which the power from the main power source is input;
      a planetary carrier that is connected to the first output shaft;
      a first planetary pinion that is turnably supported by the planetary carrier and meshes with the ring gear;
      a second planetary pinion that is turnably supported by the planetary carrier and meshes with the first planetary pinion;
      a first sun gear that meshes with the first planetary pinion; and
      a second sun gear that is connected to the second output shaft and meshes with the second planetary pinion; and
   a distribution electric motor that is rotationally connected to the planetary gear mechanism only through the first sun gear, and from which torque for changing the torque distribution ratio is input to the planetary gear mechanism.

2. The power distribution device according to claim 1, wherein the first sun gear is attached on a first sun gear shaft that is a hollow shaft having a space through which the second output shaft extends, and a rotor of the distribution electric motor is joined to the first sun gear shaft.

3. The power distribution device according to claim 1, wherein the first sun gear is attached on a first sun gear shaft that is a hollow shaft having a space through which the second output shaft extends, and the first sun gear shaft is connected to a rotor of the distribution electric motor via a reduction gear pair that slows down turning of the distribution electric motor and transfers the turning of the distribution electric motor to the first sun gear shaft.

4. The power distribution device according to claim 1, wherein
the first output shaft is connected to the planetary carrier via a first intermediate shaft joined to the planetary carrier and a first reduction gear pair that slows down turning of the first intermediate shaft and transfers the turning of the distribution electric motor to the first output shaft;
the second output shaft is connected to the second sun gear via a second intermediate shaft joined to the second sun gear and a second reduction gear pair that slows down turning of the second intermediate shaft and transfers the turning of the distribution electric motor to the second output shaft; and
the second intermediate shaft is a hollow shaft having a space through which a first sun gear shaft extends, the first sun gear shaft joining together the distribution electric motor and the first sun gear.

5. The power distribution device according to claim 1, wherein
the distribution electric motor is rotationally connected to the first sun gear by a common shaft.

6. A power distribution device for splitting power input from a main power source between a first output shaft and a second output shaft, the power distribution device having a variable torque distribution ratio and comprising:
a planetary gear mechanism including:
a ring gear to which the power from the main power source is input;
a planetary carrier that is connected to the first output shaft;
a first planetary pinion that is turnably supported by the planetary carrier and meshes with the ring gear;
a second planetary pinion that is turnably supported by the planetary carrier and meshes with the first planetary pinion;
a first sun gear that meshes with the first planetary pinion; and
a second sun gear that is connected to the second output shaft and meshes with the second planetary pinion; and
a distribution electric motor that is connected to the first sun gear, and from which torque for changing the torque distribution ratio is input to the planetary gear mechanism, wherein
the first output shaft is connected to the planetary carrier via a first intermediate shaft joined to the planetary carrier and a first reduction gear pair that slows down turning of the first intermediate shaft and transfers the turning of the distribution electric motor to the first output shaft;
the second output shaft is connected to the second sun gear via a second intermediate shaft joined to the second sun gear and a second reduction gear pair that slows down turning of the second intermediate shaft and transfers the turning of the distribution electric motor to the second output shaft; and
the second intermediate shaft is a hollow shaft having a space through which a first sun gear shaft extends, the first sun gear shaft joining together the distribution electric motor and the first sun gear.

* * * * *